United States Patent [19]

Fleming et al.

[11] Patent Number: 4,762,537

[45] Date of Patent: Aug. 9, 1988

[54] ADSORBENT FOR HCL COMPRISING ALUMINA AND ACID-TREATED Y ZEOLITE

[75] Inventors: Hubert L. Fleming, Mars; Kenneth P. Goodboy, Wexford; Emmanuel K. Saforo, Zelienople, all of Pa.

[73] Assignee: Aluminum Company of America, Pittsburgh, Pa.

[21] Appl. No.: 56,714

[22] Filed: Jun. 2, 1987

Related U.S. Application Data

[63] Continuation-in-part of Ser. No. 795,907, Nov. 7, 1985.

[51] Int. Cl.$^4$ ............................................. B01D 53/04
[52] U.S. Cl. ........................................... 55/71; 55/74; 55/75; 55/387; 55/389; 502/64; 502/79
[58] Field of Search .................... 55/68, 71, 75, 387, 55/389; 502/63, 64, 79, 415

[56] References Cited

U.S. PATENT DOCUMENTS

| | | | |
|---|---|---|---|
| 3,025,233 | 3/1962 | Figert | 210/502 |
| 3,130,007 | 4/1964 | Breck | 55/75 X |
| 3,235,089 | 2/1966 | Burroughs | 502/64 X |
| 3,326,818 | 6/1967 | Gladrow et al. | 502/64 |
| 3,523,092 | 8/1970 | Kearby | 502/64 |
| 3,526,322 | 9/1970 | Burroughs | 502/63 |
| 3,899,310 | 8/1975 | Chi et al. | 55/71 |
| 3,917,544 | 11/1975 | Michel | 252/455 Z |
| 4,151,119 | 4/1979 | Gladrow | 502/64 |
| 4,212,771 | 7/1980 | Hamner | 502/64 |
| 4,259,212 | 3/1981 | Gladrow et al. | 502/79 X |
| 4,374,654 | 2/1983 | McCoy | 55/71 |
| 4,499,208 | 2/1985 | Fuderer | 502/415 |
| 4,529,416 | 7/1985 | Sircar et al. | 55/75 X |
| 4,557,921 | 12/1985 | Kirsch et al. | 55/71 X |
| 4,639,259 | 1/1987 | Pearson | 55/71 |

FOREIGN PATENT DOCUMENTS

| | | | |
|---|---|---|---|
| 2923117 | 12/1979 | Fed. Rep. of Germany | 502/79 |
| 84639 | 7/1981 | Japan | 502/79 |
| 156913 | 9/1984 | Japan | 502/64 |
| 1491563 | 11/1977 | United Kingdom . | |

Primary Examiner—Robert Spitzer
Attorney, Agent, or Firm—Glenn E. Klepac

[57] ABSTRACT

A composite HCl adsorbent comprising about 50–95 wt % alumina and about 5–50 wt % Y zeolite wherein the molar ratio of $SiO_2$ to $Al_2O_3$ is about 4.5–6.0. The adsorbent is produced by admixing particles of alumina and acid-treated Y zeolite, agglomerating, aging and activating. The activated composite adsorbent has improved dynamic adsorption behavior for HCl compared with both the alumina and Y zeolite starting materials.

20 Claims, 3 Drawing Sheets

ADSORBENT FOR HCL COMPRISING ALUMINA AND ACID-TREATED Y ZEOLITE

CROSS-REFERENCE TO RELATED APPLICATION

This application is a continuation-in-part application of U.S. Ser. No. 795,907, filed Nov. 7, 1985.

FIELD OF THE INVENTION

The present invention relates to adsorbents for removing hydrogen chloride from other gases.

BACKGROUND OF THE INVENTION

When hydrogen gas is produced during the catalytic reformation of petroleum products, the gas is usually contaminated with about 2–5 ppm HCl. This chloride contamination results from chlorides that are injected into the system to regenerate the reforming catalyst. Hydrogen gas formed in the process leaches away chlorides from the catalyst so that the gas is eventually contaminated with HCl.

The hydrogen chloride may corrode metal components of downstream systems or result in formation of ammonium chloride. The salts formed may be deposited in openings of fuel system burners or compressor valves, thereby necessitating expensive repairs. Because of the corrosivity of HCl in downstream processing, there is a need to remove virtually all of it at least below 1 ppm levels.

In the prior art, alumina and some forms of molecular sieves have been used as adsorbents for hydrogen chloride. However, these prior art adsorbents each suffer from one or more serious disadvantages making them less than entirely suitable for their intended purpose.

Activated alumina is known to be an inexpensive adsorbent that is effective for removing high concentrations of hydrogen chloride from other gases. However, alumina is much less effective at low chloride concentrations (i.e. less than about 100 ppm) than at higher concentrations.

Various molecular sieves other than Y zeolite have been used in the prior art as adsorbents for small concentrations of HCl. However, these adsorbents are expensive and they are chemically degraded by HCl. Pure Y zeolites are particularly unsuitable as HCl adsorbents because they are so readily attacked.

The following are some prior patents disclosing adsorbents based upon combinations of alumina and molecular sieves: Figert U.S. Pat. No. 3,025,233; Chi et al U.S. Pat. No. 3,899,310; Michel U.S. Pat. No. 3,917,544; Podschus British No. 1,491,563. None of these patents discloses or suggests the composite adsorbent comprising alumina and Y zeolite that is claimed herein.

It is a principal objective of the present invention to provide a material that is an effective adsorbent for low concentrations of gaseous HCl while being chemically stable to HCl.

A related objective of the invention is to provide an HCl adsorbent requiring a shortened adsorber bed length to reduce HCl concentrations compared with prior art adsorbents.

Another objective of the invention is to provide a novel method for producing the composite adsorbent.

A further objective of the invention is to provide a method for removing HCl from a gas, using the composite adsorbent of the invention.

Additional objectives and advantages will become apparent to persons skilled in the art from the following specification and claims.

SUMMARY OF THE INVENTION

In accordance with the present invention, a composite adsorbent useful for adsorbing gaseous HCl is produced by agglomerating alumina particles in the presence of water with Y zeolite particles having an average particle size of less than about 10 microns. The alumina particles may be unactivated or activated alumina or mixtures thereof.

The alumina is preferably activated alumina obtained by sizing alumina to an average particle size of about 10 microns or less, and then rapidly activating the sized alumina particles by exposure to an elevated temperature of greater than about 300° C. for less than 1 minute, thereby to form activated alumina particles having an LOI (hydroxyl content determined by drying at 400° C. and then heating at 1100° C.) of about 6–10 wt %.

The activated alumina particles preferably have an average particle size of about 3–7 microns. Average particle sizes of about 4.5–5.0 microns are particularly preferred. The alumina and zeolite particles preferably each have a narrow particle size distribution in order to produce a composite adsorbent having increased porosity.

The Y zeolite particles are preferably sodium Y zeolite although other forms of Y zeolite may be employed on a less preferred basis. Such other forms include hydrogen, calcium, strontium, cesium and cerium Y zeolites. As used herein, the term "sodium Y zeolite" refers to the synthetic, crystalline, zeolitic, sodium aluminosilicate that is covered by Breck U.S. Pat. No. 3,130,007, issued Apr. 21, 1964. The disclosure of said patent is incorporated herein by reference to the extent consistent with the present invention. Although the Breck patent discloses useful techniques for manufacturing Y zeolite that is suitable for some catalyst and adsorbent applications, the patent does not identify Y zeolite having sufficiently low sodium silicate content to make an effective composite adsorbent for gaseous HCl.

The Y zeolite employed herein preferably comprises crystalline particles that are at least about 95% crystalline, as measured by the method described in ASTM D-3906-80. Affinity of the composite adsorbent for HCl is increased when the zeolite possesses greater crystallinity. The Y zeolite preferably has a molar ratio of $SiO_2$ to $Al_2O_3$ of about 4.5–6.0. A preferred molar ratio of $SiO_2$ to $Al_2O_3$ in the Y zeolite is about 4.8–6.0. The Y zeolite particles should have an average ultimate crystal size of less than about 5 microns.

The Y zeolite preferably is sodium Y zeolite having $Na_2O$ content of at least about 12.7 wt %. The sodium Y zeolite should have a sufficiently low content of sodium silicate that a 20 wt % aqueous slurry of the particles (on a hydrated or "as is" basis) has a pH of less than about 10.42. Excessive sodium silicate content deactivates the zeolite by causing it to convert to a sodium aluminosilicate glass upon activation and by blocking pores in the zeolite cage structure.

The sodium Y zeolite must be treated with acid to reduce its sodium silicate content to suitable levels. The zeolite is preferably washed with an aqueous solution of an acid having pK of about 4–7. As used herein, the term "pK" refers to the logarithm of the acid dissociation constant. Some suitable acids are monocarboxylic acids such as formic, acetic, propionic, and butyric acids; dicarboxylic acids such as oxalic, malonic, succinic, glutaric, and adipic acids; and a few inorganic acids such as carbonic acid. Weak (1-10 wt %) solutions of acetic acid are particularly preferred because they are inexpensive and readily available. Strong acids such as phosphoric acid, hydrochloric acid, and sulfuric acid are avoided because they attack the zeolite.

The adsorbent usually comprises about 50-95 wt % alumina and about 5-50 wt % Y zeolite, preferably about 70-80 wt % alumina and about 20-30 wt % Y zeolite. A particularly preferred adsorbent comprises about 75 wt % alumina and about 25 wt % Y zeolite. Proportions of zeolite and alumina are calculated on an oxide or dehydrated basis.

The step of agglomerating the activated alumina particles with Y zeolite typically comprises a ball forming process. This step results in formation of composite agglomerates usually having about 30-40 wt % water content.

The composite agglomerates are aged in the presence of water preferably at pH greater than 7 and at a temperature of about 0°-60° C. Aging for about 2-4 hours at about 30° C. is particularly preferred. Aging at excessive temperatures or for unduly long times causes hydrothermal decomposition of the agglomerates.

The aged agglomerates are desirably tunnel activated in a roll kiln wherein the agglomerates reach a final temperature of about 450° C. Activation temperatures of about 420°-550° C. are satisfactory, with 420°-475° C. temperatures being particularly suitable.

The activated composite agglomerates generally have an LOI of less than about 6.0 wt % and greater than about 200 m²/g surface area. All surface areas are measured by a single point nitrogen BET technique. Surface areas greater than about 300 m²/g are preferred and surface areas greater than about 400 m²/g are particularly preferred.

The composite agglomerates of the invention are especially suitable for adsorbing HCl in concentrations of less than about 100 ppm. A particularly preferred application comprises adsorption of HCl in hydrogen reformer gas containing less than about 10 ppm HCl, usually about 2-5 ppm HCl. The composite adsorbent of the invention also preferentially adsorbs HCl from other gas mixtures, including mixtures containing water vapor and/or volatile hydrocarbons.

DETAILED DESCRIPTION OF A PREFERRED EMBODIMENT

Figure 1:
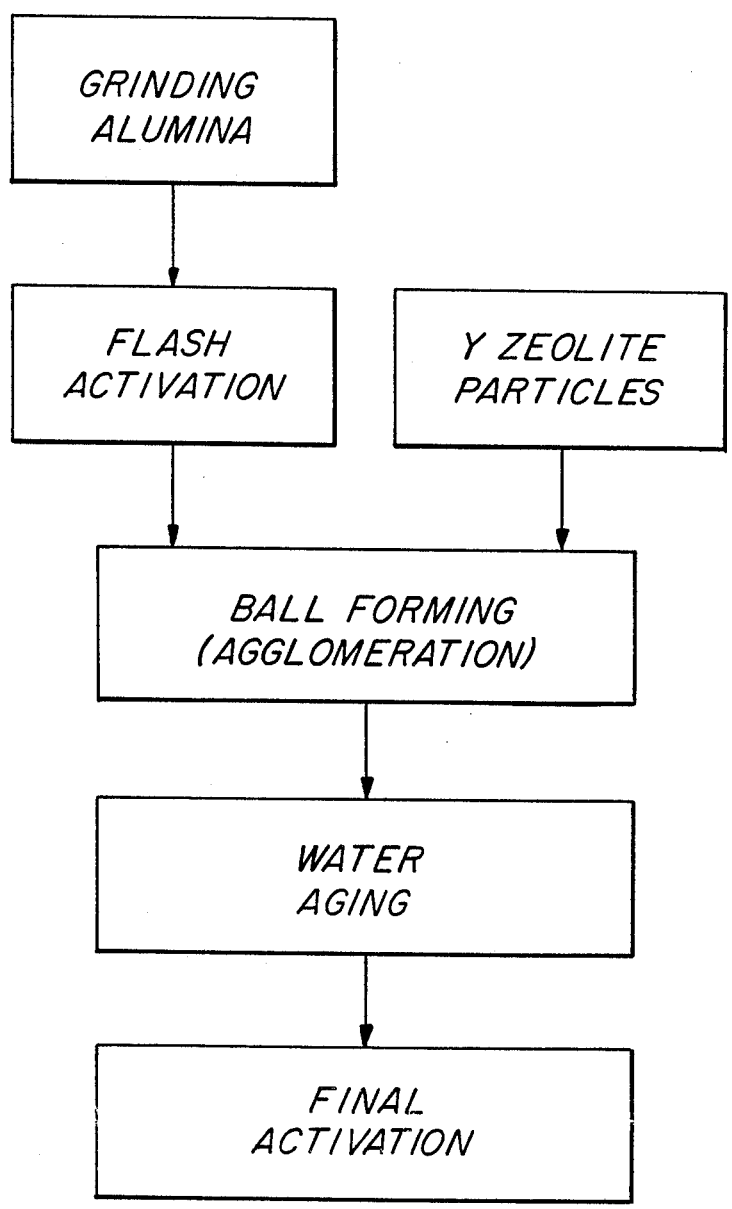
FIG. 1 is a schematic flow sheet diagram showing a novel process for producing the adsorbent of the invention.

One of the starting materials for the preferred composite adsorbent of the present invention is an unground hydrated alumina having an average particle size of about 75 microns or larger. One suitable alumina is sold by Aluminum Company of America under the designation of C-30 and has an average particle size of approximately 100 microns. This material should be ground to an average particle size of about 10 microns or less before it is activated. Any grinding technique known to those skilled in the art may be used. The ground alumina has an average particle size of about 3-7 microns, preferably about 4.5-5 microns.

Once the alumina has an average particle size of about 10 microns or less, it is rapidly activated by exposure to high temperature for a brief period of time. Methods for such rapid activation are well known in the art. One technique which has been found to be particularly useful is described in Saussol U.S. Pat. No. 2,915,365. The disclosure of such patent is incorporated herein to the extent that it is not inconsistent with the present invention. In accordance with this technique, alumina trihydrate is injected into a stream of highly heated gases (e.g. air) at gas temperatures of greater than 300° C., such as 300°-1,000° C., with 300°-400° C. being the preferred range. The duration of contact between the alumina trihydrate and the hot gas may be less than 1 minute, such as from a fraction of a second to several seconds, with the preferred contact time being about 1 second.

The alumina, once activated, is an amorphous transition alumina. If the hydrate were not ground prior to rapid activation, crystalline boehmite would be present in the activated powder. The presence of boehmite is undesirable because it increases the hydroxyl content (indicated by LOI) of the activated alumina. These particles generally have about 6-10 wt % LOI, with about 8-9 wt % being typical.

The other starting material, crystalline sodium Y zeolite, must generally be initially deagglomerated into particles having an average size of about 3-5 microns. Particles smaller than about 1-2 microns are undesirable because electrostatic effects cause them to agglomerate. Larger particles are avoided because they are more difficult to ball form when mixed with activated alumina.

The Y zeolite should have a molar ratio of $SiO_2$ to $Al_2O_3$ of about 4.8-6.0. When this ratio is less than about 4.5, the resulting adsorbent has reduced thermal stability. The Y zeolite is desirably more than about 95% crystalline. In other words, the material is less than about 5% amorphous, as measured by X-ray diffraction.

Sodium oxide content of the sodium Y zeolite is desirably at least about 12.7 wt % and preferably at about the maximum theoretical level. Sodium silicate content should be sufficiently low that a 20 wt % aqueous slurry of the zeolite particles has a pH of less than about 10.42. Sodium silicate content is reduced to acceptable levels by washing the zeolite in a warm dilute acetic acid solution. The zeolite is preferably washed in 5 wt % aqueous acetic acid at about 40°-50° C. for a few hours. Sodium silicate content is thereby lowered sufficiently that a 20 wt % aqueous slurry of the zeolite particles has a pH of about 10.2-10.3.

Zeolite particles producing a pH of greater than about 10.5 in 20 wt % aqueous slurry are unsuitable for practicing the present invention. Such zeolites lead to formation of glasses having very low surface areas when combined with alumina into composite adsorbents.

The Y zeolite particles should have an ultimate crystal size of less than about 5 microns. Particles having an ultimate crystal size below about 3.5 microns are particularly suitable.

In a particularly preferred embodiment, about 75 wt % of the activated alumina and about 25 wt % Y zeolite are mixed together and ball formed (agglomerated) in the presence of water and then exposed to steam. The resulting agglomerates containing about 30–40 wt % water are then aged at about 30° C. for about 2–4 hours. Aging is performed at a pH of greater than 7. It is undesirable to perform the aging step at greater than 80° C. in order to avoid boehmite formation in the alumina phase and sodium silicate formation in the zeolite phase.

The aged agglomerates are tunnel activated in a roll kiln that is divided into four zones having increasing temperature. After about 2 hours, the agglomerates reach a final temperature of about 450° C. The agglomerates are then removed from the kiln and cooled.

The ball formed agglomerates have diameters ranging from about 1/16 inch to about ¼ inch. Bulk density is about 35–60 lb/ft$^3$.

A particularly preferred spherical agglomerate having 3/16 inch diameter has about 450 m$^2$/g surface area, 0.6 cc/g total pore volume, crush strength about 25 lb. (11.4 kg) and bulk density about 42 lb/ft$^3$ (0.67 g/cm$^3$).

The spherical agglomerates of the present invention may also be crushed into particulate form and sieved to a desired particle size. A preferred particulate adsorbent having 28–48 mesh size (Tyler series) has a bulk density of about 30–45 lb/ft$^3$.

A comparison of adsorption rates for the adsorbent of the invention and two prior art activated alumina adsorbents is compiled in Table I. These data indicate that the composite adsorbent has significantly higher initial and global adsorption rates than activated alumina in this dynamic test. Pure sodium Y zeolite has initial and global adsorption rates comparable to the composite adsorbent. However, pure zeolites cannot be used as HCl adsorbents because of their chemical and physical instability. Hydrochloric acid attacks the zeolite, most likely due to the high Si/Al ratio and results in deterioration of zeolite agglomerates. Accordingly, pure zeolites are not ordinarily useful as HCl adsorbents.

Figure 2:
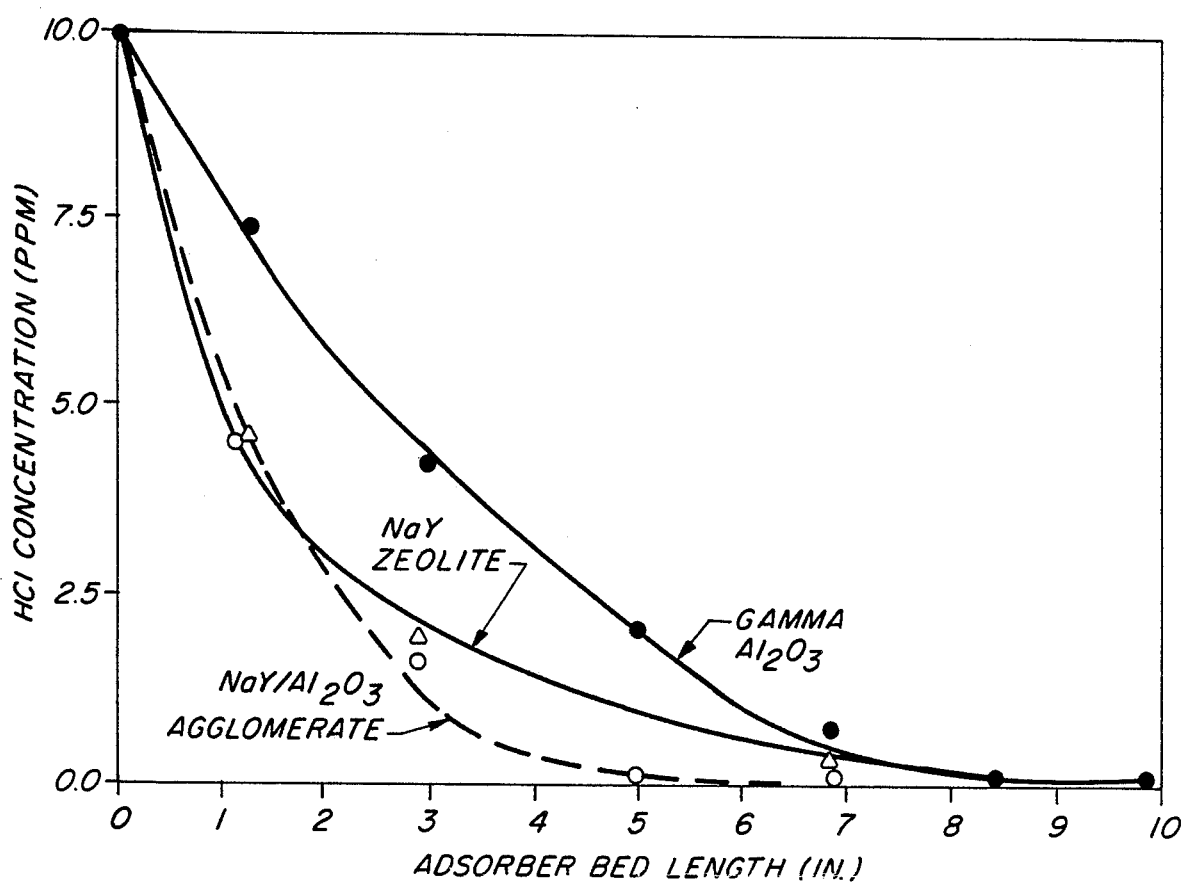
FIG. 2 is a graph showing HCl adsorption isotherms of the adsorbent of the invention and various other adsorbents.

The dynamic behavior of various HCl adsorbents is illustrated in FIG. 2. The data in FIG. 2 were obtained by taking gas samples at spaced intervals along an adsorber bed supplied with a gas comprising 10 ppm HCl in nitrogen at 50 cm$^3$/mm and 25° C. Concentrations of HCl were measured by mass spectrometry. Surprisingly, the data in FIG. 2 demonstrate that the composite adsorbent of the invention requires a reduced adsorber bed length compared with both sodium Y zeolite and gamma-alumina for reduction of HCl concentration below the 0.2 ppm level. These data suggest that significant reductions in both adsorber bed size and HCl effluent levels can be achieved by using the composite adsorbent of the present invention.

Figure 3:
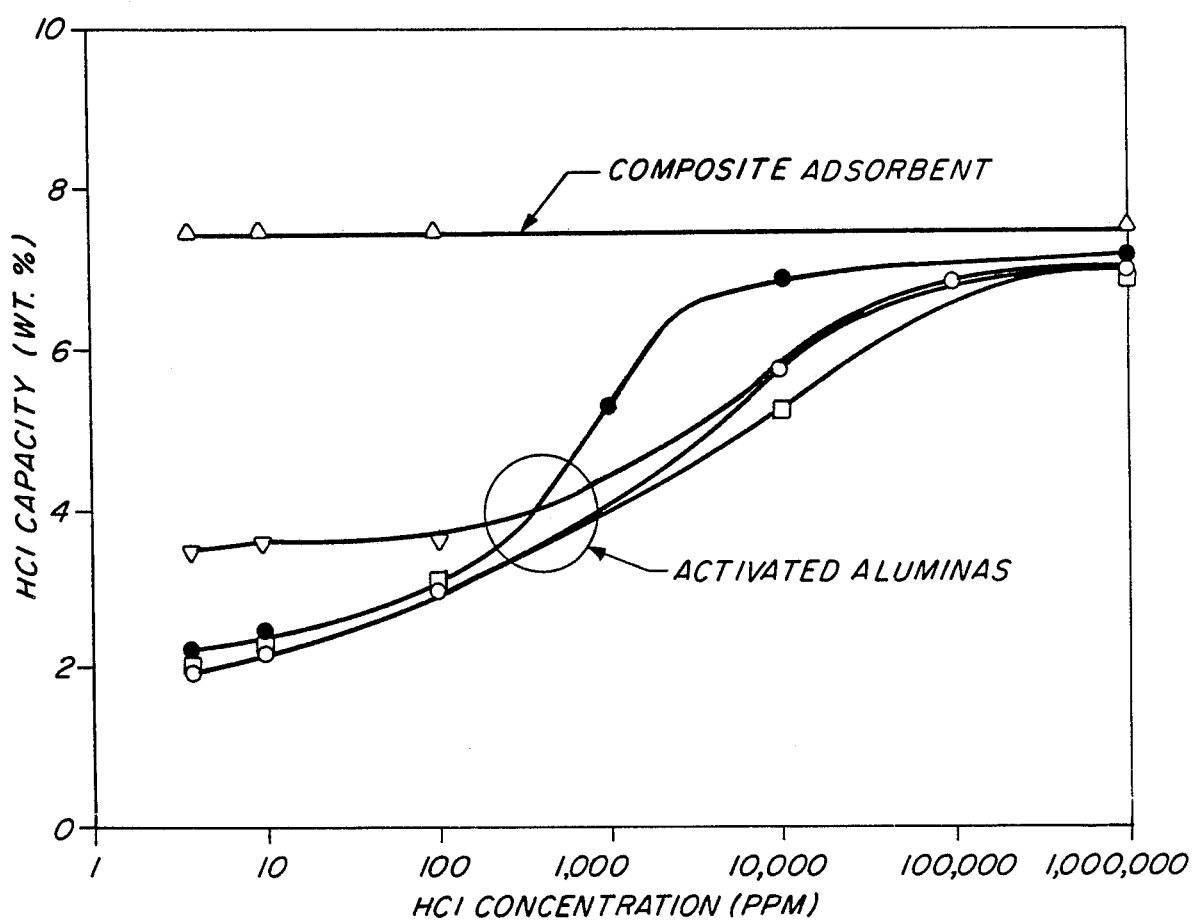
FIG. 3 is a graph showing dynamic HCl adsorption behavior for the adsorbent of the invention and two other adsorbents.

Adsorption isotherms for the composite adsorbent of the invention and various activated aluminas are shown in FIG. 3. The isotherms are equilibrium measurements obtained by thermogravimetric analysis of adsorbent samples exposed to various concentrations of HCl in H$_2$ at 25° C. and atmospheric pressure with dynamic excess flow of the gas. These data indicate greater HCl adsorption capacity for the composite adsorbent of the invention, particularly at HCl concentrations below about 1,000 ppm.

TABLE I

| | HCl Adsorption Rate Data (10 ppm HCl/N$_2$, 50 cc/min., 25° C.) | | |
|---|---|---|---|
| | Composite Adsorbent (⅛" Diameter) | Activated Alumina (⅛" Diameter) | Activated Alumina Gel (⅛" Diameter) |
| Initial Rate (%/hr) | 0.49 | 0.062 | 0.043 |
| Global Rate (%/hr) | 0.38 | 0.034 | 0.024 |

While the invention has been described in terms of preferred embodiments, the claims appended hereto are intended to encompass all embodiments which fall within the spirit of the invention.

What is claimed is:

1. A method for removing HCl from a gas containing less than about 100 ppm HCl, comprising removing said HCl by contacting said gas with a solid composite adsorbent having surface area greater than about 200 m$^2$/g and comprising about 50–95 wt % alumina and about 5–50 wt % Y zeolite, said adsorbent being produced by treating Y zeolite particles with an aqueous acid solution to reduce their sodium silicate content, admixing the acid-treated Y zeolite particles with alumina particles, agglomerating the Y zeolite and alumina particles into a composite agglomerate, aging said agglomerate in the presence of water and activating the composite agglomerate at an elevated temperature.

2. The method according to claim 1 wherein the Y zeolite particles have sufficiently low sodium silicate content that a 20 wt % aqueous slurry has a pH of less than about 10.42.

3. A composite adsorbent useful for adsorbing gaseous HCl, said adsorbent having surface area greater than about 200 m$^2$/g and comprising
   (a) about 50–95 wt % alumina, and
   (b) about 5–50 wt % Y zeolite wherein the molar ratio of SiO$_2$ to Al$_2$O$_3$ is about 4.5–6.0,
said adsorbent being produced by admixing particles of alumina with particles of Y zeolite treated with an acid solution so that their sodium silicate content is sufficiently low that a 20 wt % aqueous slurry has a pH of less than about 10.42, agglomerating the alumina and Y zeolite particles into a composite agglomerate, aging said agglomerate in the presence of water and activating said agglomerate at an elevated temperature.

4. The adsorbent of claim 3 wherein the alumina particles include activated alumina having an average particle size of about 10 microns or less.

5. The adsorbent of claim 4 wherein the molar ratio of SiO$^2$ to A$^2$O$^3$ in the Y zeolite is about 4.8–6.0.

6. The adsorbent of claim 4 comprising about 70–80 wt % alumina and about 20–30 wt % Y zeolite.

7. The adsorbent of claim 4 wherein said Y zeolite comprises sodium Y zeolite.

8. The adsorbent of claim 4 having a surface area of greater than about 300 m$^2$/g and an LOI of less than about 6.0 wt %.

9. The adsorbent of claim 3 wherein said acid solution is an aqueous solution of an acid having a pK of about 4–7.

10. The adsorbent of claim 9 wherein said acid is acetic acid.

11. The adsorbent of claim 3 wherein said composite agglomerate is aged at a pH greater than 7 and at a temperature of about 0°–60 C.

12. A method for producing a composite adsorbent useful for adsorbing gaseous HCl, said method comprising
   (a) treating particles of Y zeolite with an aqueous acid solution to reduce the sodium silicate content, said Y zeolite particles having an average particle size of less than about 10 microns,
   (b) sizing alumina to an average particle size of about 10 microns or less,
   (c) agglomerating the alumina particles in the presence of water with the Y zeolite particles, thereby to form a composite agglomerate,
   (d) aging the composite agglomerate in the presence of water at pH greater than 7 to strengthen the agglomerate, and
   (e) activating the composite agglomerate by exposure to an elevated temperature of about 420°–550° C.

13. The method according to claim 12 further comprising, prior to step (c)
   (f) rapidly activating the sized alumina particles by exposure to an elevated temperature of about 300°–1000° C. for less than one minute, thereby to form activated alumina particles having an LOI of about 6–10 wt %.

14. The method according to claim 13 wherein step (a) comprises treating said Y zeolite particles with an aqueous solution of an acid having a pK of about 4–7.

15. The method according to claim 14 wherein said acid is acetic acid.

16. The method according to claim 14 wherein the Y zeolite particles have an average particle size of about 3–5 microns.

17. The method according to claim 14 wherein the molar ratio of $SiO_2$ to $Al_2O_3$ in the Y zeolite is about 4.5–6.0.

18. The method according to claim 14 wherein step (c) comprises combining about 50–95 wt % activated alumina with about 5–50 wt % sodium Y zeolite.

19. The method according to claim 14 wherein step (d) is performed at a temperature of about 0°–60° C.

20. The method according to claim 14 wherein step (e) is performed at a temperature of about 420°–475° C.

* * * * *